United States Patent [19]

Diehl et al.

[11] Patent Number: 4,926,810

[45] Date of Patent: May 22, 1990

[54] ENGINE VIBRATION BALANCER

[75] Inventors: Roy E. Diehl, Northville; Alvin H. Berger, Brownstone, both of Mich.

[73] Assignee: Ford Motor Company, Dearborn, Mich.

[21] Appl. No.: 253,474

[22] Filed: Oct. 5, 1988

[51] Int. Cl.⁵ ............................................. F02B 75/06
[52] U.S. Cl. ............................. 123/192 B; 123/192 R; 74/604
[58] Field of Search ............ 123/192 R, 192 B, 198 E; 74/603, 604, 574

[56] References Cited

U.S. PATENT DOCUMENTS

| | | | |
|---|---|---|---|
| 1,640,634 | 8/1927 | Wise | 123/192 R |
| 2,235,160 | 3/1941 | Ljungstrom | 123/192 B |
| 3,468,190 | 9/1969 | Sampietro | 74/604 |
| 4,688,528 | 8/1987 | Nivi et al. | 123/192 B |
| 4,781,156 | 11/1988 | Berger et al. | 123/192 R |

FOREIGN PATENT DOCUMENTS 2333038  1/1975  Fed. Rep. of Germany .

Primary Examiner—Noah P. Kamen
Attorney, Agent, or Firm—Jerome R. Drouillard; Clifford L. Sadler

[57] ABSTRACT

An automotive engine crankshaft has a pair of vibration balancing masses pivotally secured to and depending from a main bearing cap for oscillatory movements in response to being driven by contoured cam wheels on the cheeks of the crankshaft, the cam wheels engaging rollers or cam follower sliding shoes on a bell crank type balancing mass, the vertical movements of the balancing mass centers providing forces in direct opposition to the forces caused by the engine second order vertical shake unbalance, to cancel the same.

4 Claims, 3 Drawing Sheets

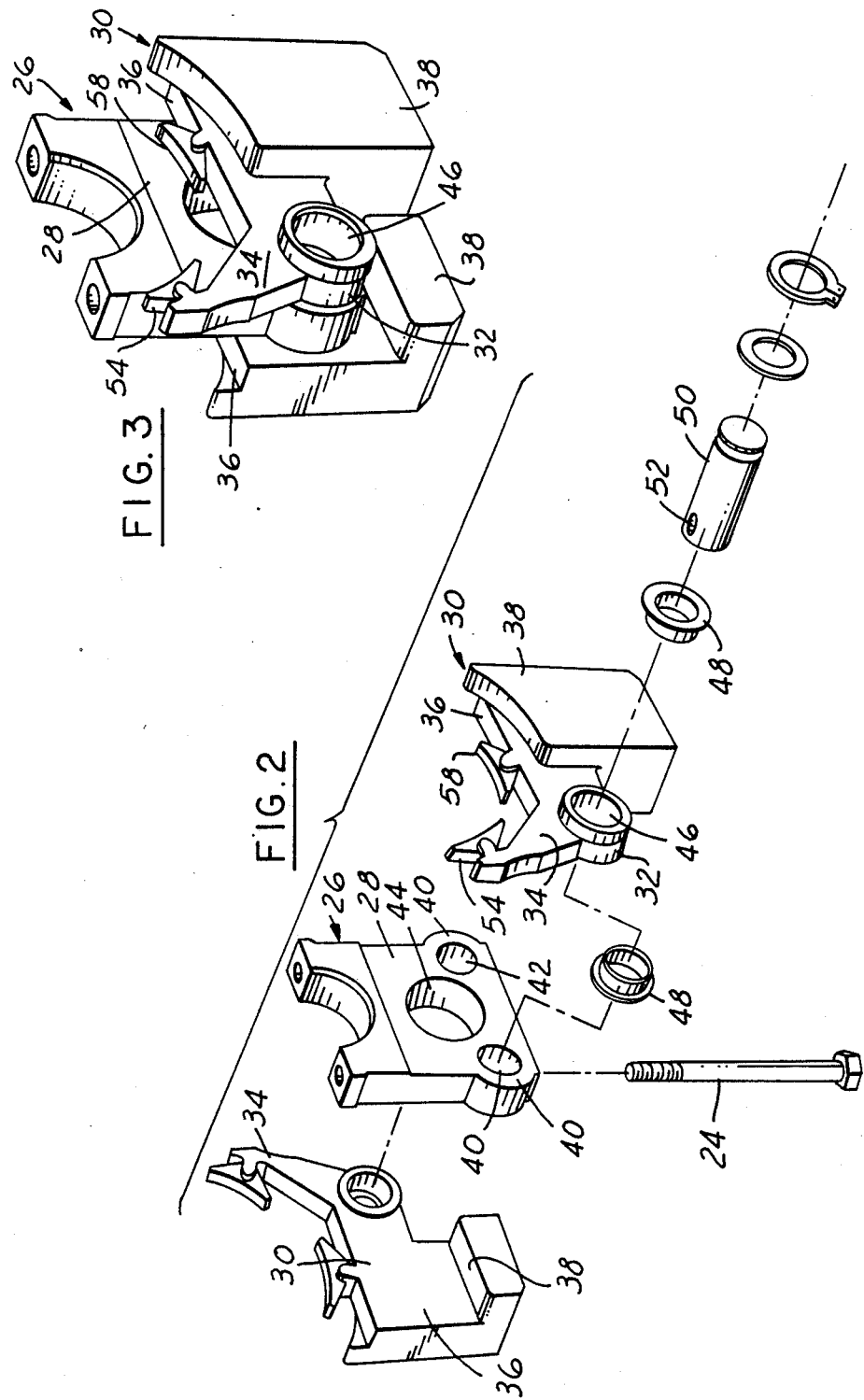

ENGINE VIBRATION BALANCER

BACKGROUND OF THE INVENTION

1. Field of the Invention

This invention relates in general to a motor vehicle type engine, and more particularly, to a means for balancing engine vibrations.

It is a primary object of the invention to provide a desmodromic device that will balance second order engine vibrations; i.e., those vibrations that are caused by second order vertical shake as the pistons move radially, by means of a crankshaft-driven vibration balancing mass that is oscillated by contoured cams attached to the crankshaft and engaging low friction cam follower rollers or sliding shoes pivotally secured to a balancing mass.

The invention, therefore, is directed to a force driven balancing mass in contrast to a vibration driven balancing device that would cause the engine to be less responsive to vibrations rather than cancelling or balancing them out in the manner of this invention.

2. Description of the Prior Art

Crankshaft-driven vibration balancing devices are known. For example, Sampietro, U.S. Pat. No. 3,468,190, shows a vibration balancing mass consisting of a piston secured to a shaft having wheels or rollers at its opposite ends engageable with contoured cams on the cheeks of the crankshaft. Reciprocation of the piston balances secondary shake forces.

Ljungstrom, U.S. Pat. No. 2,235,160, shows a vibration balancer member 44 slidable vertically or radially with respect to the crankshaft in a direction directly opposite to the direction of piston travel. The mass and acceleration of the balancer are matched to those of the piston to generate forces equal and opposite to both the first and second order acceleration forces of the piston. To effectively balance the second order vertical shake of an I-4 engine, four of these balancer members would be required, one to oppose each of the engine's four pistons, which is quite different from the inventin to be described.

Research disclosure of May, 1982, No. 21731, "Reciprocating Balancer (F06)", shows an engine block having a reciprocating frame mounted on rollers on which are mounted elliptical gears engageable with a gear on the crankshaft to cause oscillation of the frame to balance undesirable engine vibrations.

Thauer et al., Offenlegungsschrift No. 23 33 038, shows a dual cam arrangement secured to the crankshaft for actuating a balancing mass that is arcuately pivotally secured to a part of the frame and movable to balance undesirable engine vibrations.

Wise, U.S. Pat. No. 1,640,634, shows a cam mounted on the crankshaft with two cam lobes for actuating a lever 36 that is attached to a reciprocating plunger for balancing engine vibrations.

It is a primary object of the invention to provide a desmodromic type vibration balancing mass that will not only cancel out undesirable engine vibrations, but will do so with a minimum of friction; this being accomplished by providing the device with low friction cam follower means.

The above prior art does not teach or describe such a construction. None of the above prior art shows or describes any means for reducing friction during oscillation of the vibration balancing mass.

DESCRIPTION OF THE DRAWINGS

Other objects, features and advantages of the invention will become more readily apparent upon reference to the succeeding, detailed description thereof, and to the drawings illustrating the preferred embodiments thereof; wherein.

FIG. 2 is an enlarged, exploded perspective view of a detail of FIG. 1;

FIG. 3 is an enlarged perspective view of the parts in FIG. 2 assembled; and

DESCRIPTION OF THE PREFERRED EMBODIMENT

Figure 1:
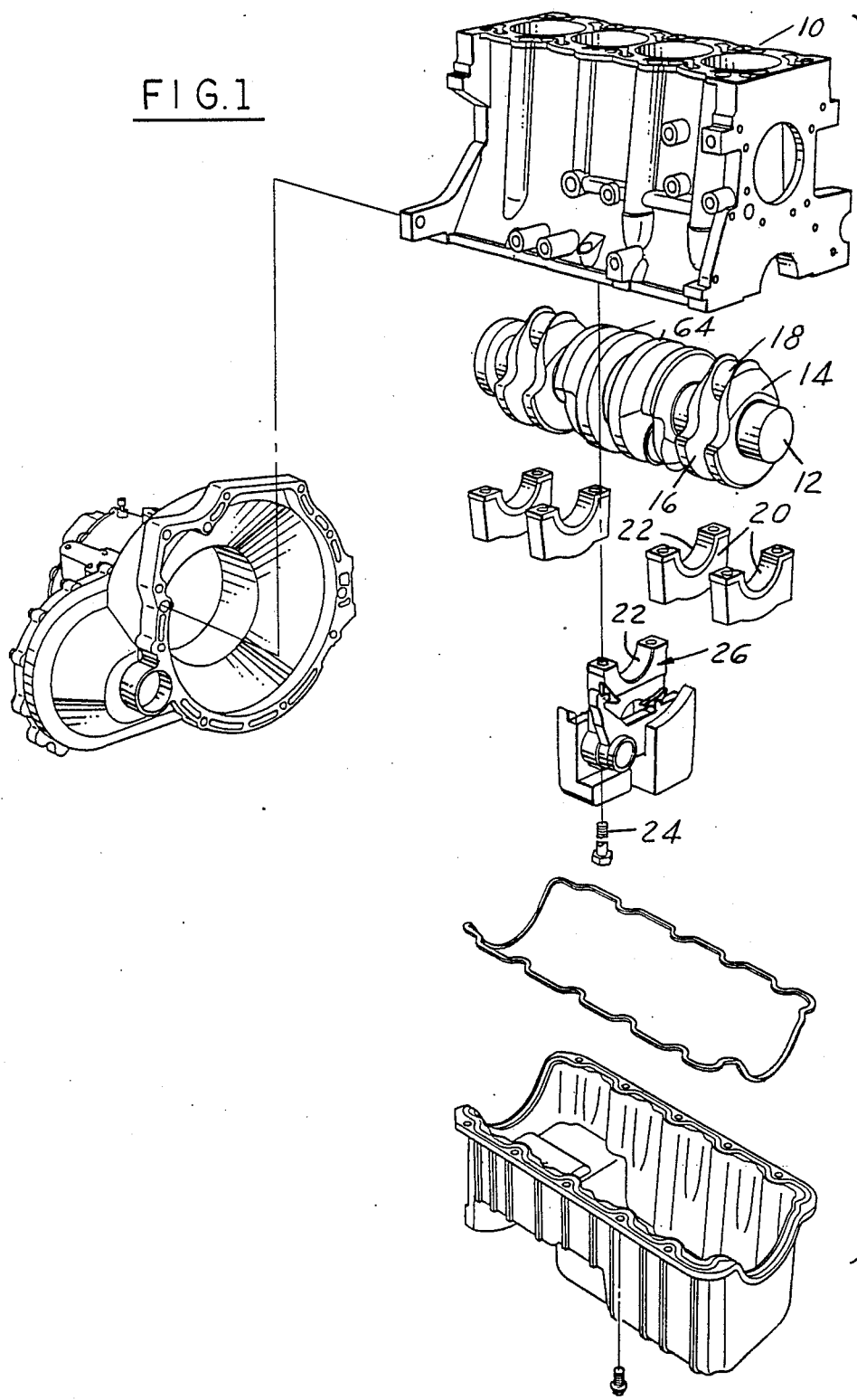
FIG. 1 is an exploded perspective view, of an engine block, crankshaft, oil pan and a vibration balancing mass embodying the invention.

FIG. 1 shows a typical engine cylinder block 10 having an automotive type engine crankshaft 12. The crankshaft is supported in the block by a number of journal type main bearings (not shown) supported in the block on upper bearing caps (also not shown) formed as a part of the block.

Crankshaft 12 is formed with the usual main bearing journals, the usual connecting rod pins 18, to which the ends of the connecting rods would be fastened in the usual manner, and the usual cheeks 14 and 16 between the connecting rod pins and the main bearings. The journal bearings and crankshaft are secured in the engine block by lower bearing caps 20 having semi-cylindrical recesses 22 for receiving the same. The lower main bearing cap is secured to the block in the usual manner by pairs (only one shown) of attaching bolts 24.

Turning now to the invention, the middle lower bearing cap 26 has an extension 28 (see FIG. 2) projecting downwardly from it for supporting thereon a pair of desmodromic engine vibration balancing masses 30.

Each mass 30 has essentially a bell crank or L-shape in cross-section (see FIG. 3), with a central fulcrum portion 32 and a pair of right angled leg portions 34, 36. The leg portions 36 have additional material 38 added to increase the mass.

The extension 28 includes portions 40 that extend laterally of the vertical axis of the cap 26, the portions having symmetrically arranged apertures or pivot pin holes 42, 44 is a lightening hole. The central fulcrum portion 32 of each mass consists essentially of a journal bearing 46 with flanged sleeve-like insert guides 48 that receive a pivot pin 50 therethrough. Each pin has a hole 52 through which the main bearing cap bolt 24 passes. The clamping force of the bolt elastically deforms the round hole 40 against the pin 50, preventing motion of the pin. Washers and lock rings are also indicated to maintain the masses in position.

Completing the construction, each leg portion 34, 36 of the mass has mounted thereon a low friction cam follower. In FIGS. 1-4, it consists of a sliding shoe 54 that is pivotally connected at 56 to the mass. The shoes have concave outer surfaces 58 (FIG. 4) that are adapted to be engaged by the contoured cam surface 60 of a cam 62 formed as an addition to the usual crankshaft cheek. The cam in this case has a somewhat elliptical shape, with major and minor axes providing small and large radii. The concave surface 58 of the sliding shoe followers are shaped to fit the longest cam radius and provide a rocking freedom of movement to compensate for the varying angle between the cam face and the balancer arm. The opposite side of the shoe is mated to a cylindrical or spherical surface on the mass.

The profile or contour 60 of cam 62 would be ground to a shape that produces a second order sinesoidal lift function on the shoe follower. In reality, the lift function will not produce pure second order sinesoidal motion of the desmodromic balancer due to the fact that the axes of the cam followers swing through arcs of radius "L" instead of translating in straight lines. However, the deviation from pure sinesoidal motion can be minimized and in practicality ignored by observing the following design parameters.

Figure 4:
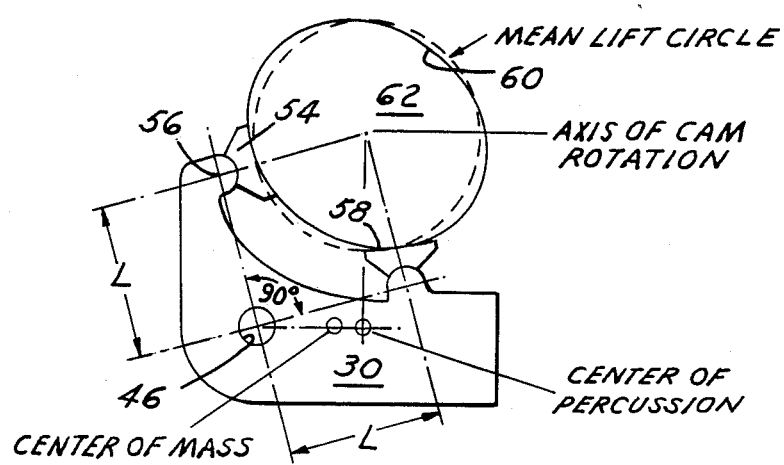
FIGS. 4 and 5 are cross-sectional schematic views of different embodiments of the invention.

As illustrated in FIG. 4, the distance from each cam follower pivot axis 56 to the balancer pivot axis is length "L", and the angle formed from the upper cam follower axis to the pivot axis to the lower cam follower axis is 90°. At the mean lift points, the distance from each of the cam follower axes to the axis of cam rotation is equal to length "L". The lift of the cam is ground approximately so that the vertical distance travelled by the balancers' center of mass times the mass of the balancer provides a force that will equal the second order unbalance to be cancelled.

Examination of the mechanism will show that during operation, each of the followers is loaded against the cam surface only within the range of mean lift through minimum lift to the following mean lift point, and is not loaded at all through the sector of maximum lift. Also, due to the inaccuracies of balancer motion caused by the follower axes moving on arcuate paths instead of straight lines. The follower which is passing through a sector of maximum lift may at times be positioned by the balancer mechanism to a lift which is less than that of the aforementioned second order sinesoidal lift function. Although these inaccuracies are very small, the necessary lash built into the system can be minimized if the maximum lift sectors of the cam are ground to the minimum material condition dictated by the actual paths of the cam followers.

Figure 5:
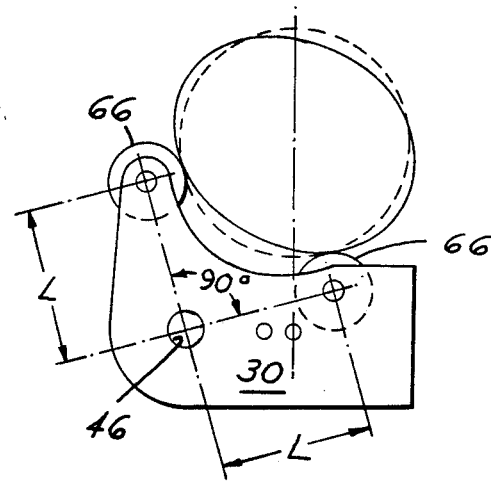

FIGS. 1–4 show the preferred sliding shoe cam follower. FIG. 5 shows an alternative embodiment using rollers 70 of appropriate diameter engaged by the cams. The advantages of using the sliding shoe followers, however, are, inter alia, (1) a lower contact pressure on the cam surface, which allows use of a softer, less expensive, cam material (note that at the point of minimum lift, where the balancer acceleration and consequently the contact force are highest, the shoe and the cam radii achieve their best fit); (2) simplicity of mechanism which will lower cost and improve reliability; and (3), better packaging (note that the upper roller follower extends farther to the left toward the oil pan wall than does the balancer mass with the sliding shoe cam followers.)

It will be clear from an inspection of the drawings and from the above description that the mass 30 will pivot about the fulcrum 32 and that this will oscillate the center of the mass indicated vertically along the vertical axis of the crankshaft and cam indicated. This is accomplished by means of the pair of essentially identical cam wheels 64 ground or contoured on the cheeks (FIG. 1) of the crankshaft. Each of the cams engages a cam follower shoe or roller 66 (FIG. 5) that is fixed on the end of the legs of the mass. The contours of the cams 64 will, within tolerances, be identical and chosen to provide balancing of the second order of vibration of the engine crankshaft to oscillate the mass 30 in the desired manner to oppose these vibrations by having the center of the mass move the required vertical distance.

From the foregoing, it will be seen that the construction provides a desmodromic type balancing mechanism where the balancing means are positively and forcedly oscillated by the cams to cancel out the unbalance due to second order vertical shake forces.

While the invention has been shown and described in its preferred embodiments, it will be clear to those skilled in the arts to which the invention pertains, that many changes and modifications may be made thereto without departing from the scope of the invention. For example, other orders of vibration could be balanced by changing cam contours and the geometry of the balancing mass amps.

We claim:

1. A crankshaft vibration balancing means for an automotive type internal combustion engine, comprising, in combination, an engine block having main bearing means, a crankshaft rotatably mounted in the bearing means, and at least one main bearing cap securing the bearing means and crankshaft to the block, and a desmodromic operating type vibration balancing mass pivotally secured to and supported upon the cap and mounted for an oscillatory movement with respect to the axis of the crankshaft to balance the second order of vibration of the crankshaft at a selected frequency of rotation thereof, and cam means on the crankshaft engagable with and oscillating the mass upon rotation of the crankshaft, the mass consisting of a pair of elements each essentially L-shaped in cross-section with a central pivot fulcrum and two leg portions extending from the pivot forming essentially a right angle with respect to each other, means securing the elements to the bearing cap on opposite axial sides thereon, the elements being arranged oppositely on the cap in a face-to-face relationship whereby the resultant center of mass of both elements lies on the vertical axis of the bearing cap and crankshaft and cam means, the cam follower means being mounted adjacent the ends of each leg portion and equidistant from the fulcrum.

2. A balancing means as in claim 1, wherein each cam follower means consists of a roller rotatably mounted adjacent the end of a leg portion.

3. A balancing means as in claim 1, wherein each cam follower means consists of a sliding shoe pivotally connected to the associated leg portion.

4. A balancing means as in claim 1, the bearing cap having an extension depending therefrom with portions extending laterally of the vertical axis of the cap, each extension portion containing an aperture for receiving therein the pivot pin for a mass.

* * * * *